US012613358B2

(12) United States Patent
Körner

(10) Patent No.: US 12,613,358 B2
(45) Date of Patent: Apr. 28, 2026

(54) OPTICAL SYSTEM AND METHOD FOR MANUFACTURING AN OPTICAL SYSTEM

(71) Applicant: TOBII AB, Danderyd (SE)

(72) Inventor: Lutz Körner, Danderyd (SE)

(73) Assignee: Tobii AB, Danderyd (SE)

( * ) Notice: Subject to any disclaimer, the term of this patent is extended or adjusted under 35 U.S.C. 154(b) by 372 days.

(21) Appl. No.: 18/134,116

(22) Filed: Apr. 13, 2023

(65) Prior Publication Data

US 2023/0333284 A1     Oct. 19, 2023

(30) Foreign Application Priority Data

Apr. 14, 2022     (SE) .................................... 2250466-6

(51) Int. Cl.
| | |
|---|---|
| *G02B 1/04* | (2006.01) |
| *G02B 1/08* | (2006.01) |
| *G02B 5/30* | (2006.01) |
| *G02B 27/00* | (2006.01) |

(52) U.S. Cl.
CPC ............... *G02B 1/041* (2013.01); *G02B 1/08* (2013.01); *G02B 5/3083* (2013.01); *G02B 27/0093* (2013.01)

(58) Field of Classification Search
CPC . G02B 1/10; G02B 1/14; G02B 1/041; G02B 1/04; G02B 3/0012; G02B 3/0031; G02B 1/12; G02B 2006/12104; G02B 2006/12102; G02B 7/02; G02B 27/00; G02B 5/1876; G02B 5/30; G02B 30/25; G02B 5/0268
See application file for complete search history.

(56) References Cited

U.S. PATENT DOCUMENTS

| | | | |
|---|---|---|---|
| 9,555,589 B1 | 1/2017 | Ambur et al. | |
| 10,474,229 B1 | 11/2019 | Gollier et al. | |
| 10,845,597 B1 | 11/2020 | Gollier et al. | |
| 2018/0120579 A1 | 5/2018 | Gollier et al. | |
| 2018/0239146 A1* | 8/2018 | Bierhuizen ........ | G02B 17/0856 |
| 2020/0249475 A1 | 8/2020 | Amirsolaimani et al. | |
| 2020/0400952 A1* | 12/2020 | Jenkins .................. | G02B 5/005 |

FOREIGN PATENT DOCUMENTS

| | | |
|---|---|---|
| WO | 2006091873 A2 | 8/2006 |
| WO | 2017041010 A1 | 9/2017 |
| WO | 2020256944 | 12/2020 |
| WO | 2021021957 A1 | 2/2021 |

OTHER PUBLICATIONS

J. Xiong et al., "Augmented reality and virtual reality displays: emerging technologies and future perspectives", Light: Science &Applications, vol. 10, 216 (2021); DOI: 10.1038/s41377-021-00658-8; section "Form factor".

Swedish Search Report for Appl. Nr. SE2250466-6, mailed on Dec. 12, 2022.

European Search Report for Appl. Nr. 23 16 7726, completed on Sep. 7, 2023.

* cited by examiner

*Primary Examiner* — Brandi N Thomas

(74) *Attorney, Agent, or Firm* — Christopher Ignatius Moylan

(57) ABSTRACT

There is provided a method for producing an optical system, whereby molds and coatings becomes embedded in the lens forming fluid, allowing the lens forming fluid to solidify.

10 Claims, 5 Drawing Sheets

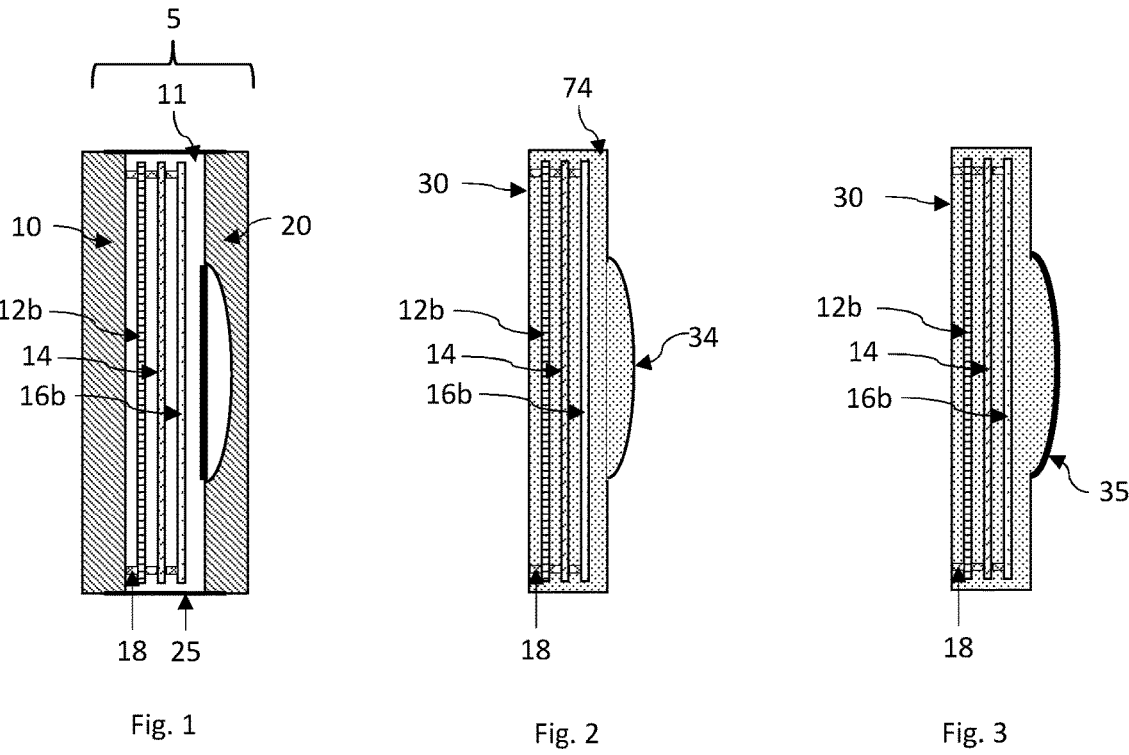
Fig. 1
Fig. 2
Fig. 3
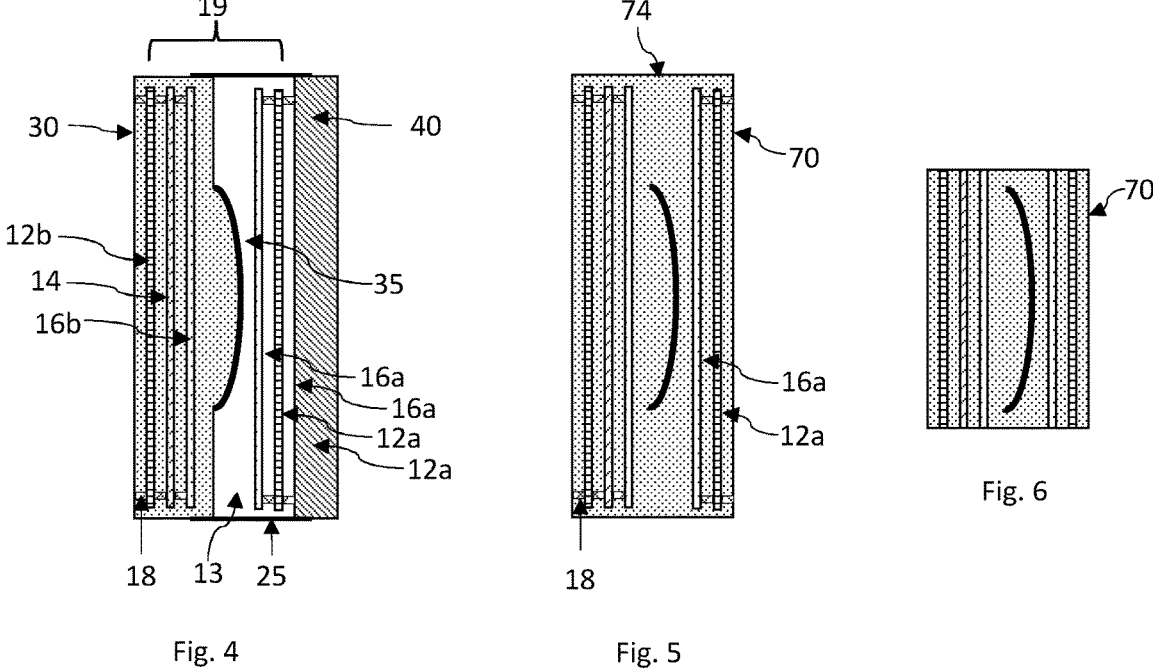
Fig. 4
Fig. 5
Fig. 6

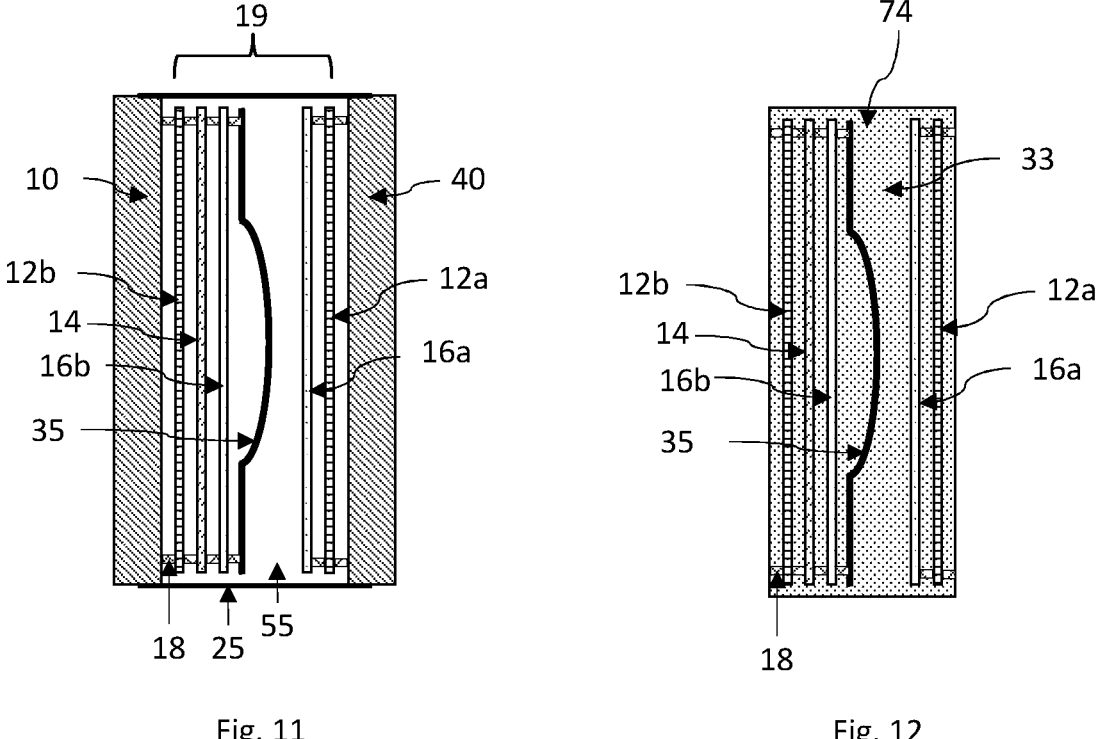
Fig. 11                                        Fig. 12
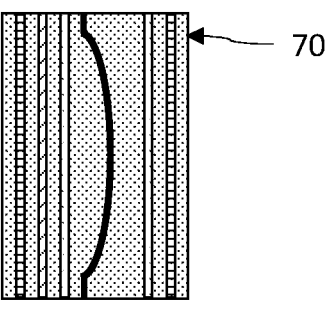
Fig. 13

OPTICAL SYSTEM AND METHOD FOR MANUFACTURING AN OPTICAL SYSTEM

CROSS-REFERENCE TO RELATED APPLICATION

The present application claims priority to Swedish patent application No. 2250466-6, filed on Apr. 14, 2022, entitled "Optical system and method for manufacturing an optical system", and is hereby incorporated by reference in its entirety.

FIELD OF THE INVENTION

This invention relates to an optical system and such as an eyepiece, in particular a monolithic device for use in for example an augmented reality device a mixed reality device or a virtual reality device, and a method for manufacturing an optical system.

BACKGROUND

So called "pancake" optics for displaying mixed reality or augmented reality to a user are known from WO2016003746 and Cakmakci, Y. Qin, P. Bosel, G. Wetzstein, Opt. Express 29, 35206-35215 (2021).

Such optical systems comprise several optical elements and are complicated to manufacture. In particular it is difficult to correctly position a curved beam splitter. Such systems are also sensitive.

There is a need for an improved optical system for use in mixed reality displays, augmented reality displays, and virtual reality displays.

There is also a need for an improved method for manufacturing complex optical systems.

SUMMARY OF INVENTION

In a first aspect of the invention there is provided a method for producing an optical system, the method comprising the steps of, in order a) providing at least a first mold part to provide a first mold cavity for an intermediate product with a surface, b) providing a lens forming fluid in the first mold cavity, and allowing the lens forming fluid to solidify, to produce an intermediate product with a surface, c) coating at least a part of the surface of the intermediate product with a material to produce an optical element in the optical system, where the material is different from the lens forming fluid, d) providing at least a second mold part for the optical system, e) arranging the intermediate product in relation to the second mold part to provide a second mold cavity such that the coating applied in step c) is exposed to the second mold cavity and f) providing lens forming fluid in the second mold cavity such that the coating applied in step c) becomes embedded in the lens forming fluid, and allowing the lens forming fluid to solidify.

The method provides a simple and efficient way of producing a complex optical system that comprises at least one optical element. The optical element will be provided in a monolithic piece where the optical element is protected. Hence no dust, water, sweat or salt can enter the system. Multiple optical elements will be precisely aligned and fixed in relation to each other. Moreover, reflection losses of element-air interfaces can be minimized by embedding the elements in a lens material with a higher refractive index. Furthermore, the monolithic cast element provides a small compact form-factor. The cast lens material offers a very low birefringence which is essential dealing with polarized light.

In various embodiments the layer coated in step c) forms a partially reflective mirror. In various embodiments the surface is concave or convex or is a Fresnel lens. This provides the advantage of not having to arrange a sensitive optical element at a correct distance and orientation in a mold before casting.

At least one additional optical element may be placed in the mold in step a) or step e) to embed the additional optical element in the optical system. The additional optical element is selected from a quarter-wave plate, a linear polarizer, a circular polarizer, a polarizing beam splitter, a circular polarizing reflector, a curved linear polarizing reflector, a display, a varifocal lens element or an eye-tracking component.

The optical element in step c) may be a partially reflective mirror and the optical system may comprise the following optical elements arranged in order from a light source to an observer: a first linear polarizer, a first quarter-wave plate, the beam splitting layer created in step c), a second quarter-wave plate, a polarization beam splitter, and a second linear polarizer.

In one embodiment the second quarter-wave plate, the polarization beam splitter, and the second linear polarizer is placed in the first mold cavity in step a), and the first linear polarizer and the first quarter-wave plate is placed in the second mold cavity in step e); or where the first linear polarizer and the first quarter-wave plate is placed in the first mold cavity in step a) and where the second quarter-wave plate, the polarization beam splitter, and the second linear polarizer is placed in the second mold cavity in step e).

The at least one additional optical element may be placed at a predefined distance from the surface which is coated in step c). The additional optical element is placed at a predefined distance from the surface to be coated in step c) using a distance element. This provides a suitable method of correctly providing an optical element in an optical system.

The coating step c) may be carried out using a thin film deposition technology.

In a second aspect of the invention there is provided an optical system comprising a solidified lens forming fluid comprising embedded therein the following optical elements arranged in order from a light source to an observer: a first linear polarizer, a first quarter-wave plate, a concave partially reflective mirror arranged to reflect light towards the observer, a second quarter-wave plate, a polarization beam splitter, and a second linear polarizer. As described above, this provides several advantages, including providing a monolithic eyepiece.

The optical system accordingly may further comprise an eye tracking component. The eye-tracking component may comprise one or more of a camera, an illuminator and an IR volume holographic element. The eye tracking component is preferably an optical element that is arranged closest to the observer.

In a third aspect of the invention there is provided a mixed reality device, an augmented reality device or a virtual reality device comprising an optical system according to the second aspect of the invention.

BRIEF DESCRIPTION OF DRAWINGS

FIGS. 1-6 are schematic drawings that show a method for producing an optical system.

FIGS. 11-13 are schematic drawings that show a method of producing an optical system.

DETAILED DESCRIPTION

Figure 7:
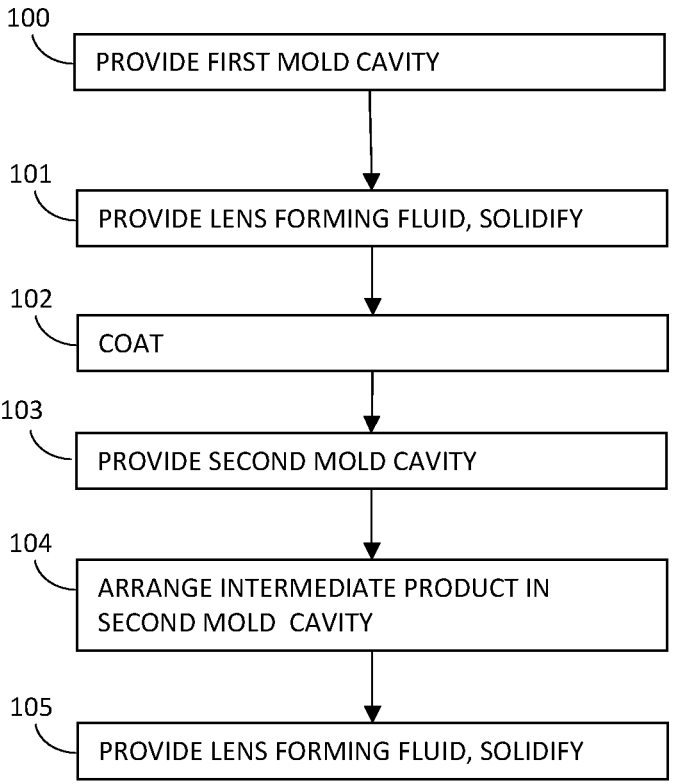
FIG. 7 is a flowchart showing a method.

The optical system 70 described herein is configured to transmit light along a path to a user's eye (observer 72). The optical system 70 may be an eyepiece for the use in a near to eye display. The near to eye display may be used in any suitable device, for example a mixed reality device, a virtual reality device or an augmented reality device.

First, a general method for producing an optical system 70 will be described with reference to FIGS. 1-7.

In step 100 (FIGS. 1 and 7), a first mold 5 comprising at least two half-molds 10, 20 provides a first molding cavity 11. The mold 5 is arranged to provide mold cavity 11 with a shape to produce an intermediate product 30. The mold parts 10, 20 (and also second mold 40 described below) may be arranged for any suitable molding technology used in the field of lens production or ophthalmology. The mold parts 10, 20, 40 may be made from any suitable material such as for example glass. The mold parts 10, 20, 40 may be sealed with a suitable sealing element 25 which may be a tape or a gasket. The mold parts 10, 20, 40 may be aligned using any suitable method. U.S. Pat. No. 6,099,764 and EP3178 640 describe methods related to lens casting, in particular sealing and alignment of molds.

It should be noted that a mold cavity 11, 13, 55 may be formed by any suitable number of mold parts 10, 20, 40 such as for example one, two, three or more mold parts 10, 20, 40.

Next, in step 101, a lens forming fluid is provided in the first mold cavity 11, for example by injection. Optionally, and as described in further detail below, optical elements 19, such as optical elements 12a, 12b, 14, 16a, 16b may be arranged in the cavity 11 before providing the lens forming fluid. The lens forming fluid may be any suitable lens forming fluid, for example a curable resin. The lens forming fluid is able to solidify, to become solidified lens forming fluid 74, for example by thermocuring or applying UV-light. The lens forming fluid is preferably an optical grade monomer formulation an ophthalmologically acceptable fluid, such as for example an acrylate more preferably a UV-curable methacrylate or a thermocurable methacrylate. The lens-forming fluid may be a lens forming liquid with a viscosity less than 1000 mPas. In some embodiments a lens-forming gel or prepolymer may be used. The lens forming fluid is allowed to solidify, which may include providing UV-light to the cavity 11. The intermediate product 30 is then removed from the mold 5 as an intermediate product 30, shown in FIG. 2. The intermediate product 30 will then have an outer surface 34.

In step 102 and as shown in FIG. 3, at least a part of the outer surface 34 is coated with a material to provide a layer to form an optical element 19 in the final optical system 70. The material used for coating is different from the lens forming fluid. Any suitable material or technology may be used. In a preferred embodiment, the coating is carried out using a thin film deposition technology, such as for example physical vapor deposition or sputtering.

The optical element 19 obtained by the coating may be a partially reflective mirror 35 (beam splitter), such as a 50/50 beam splitter. The material used for the coating may then be selected from one or more high and low refractive index materials such as for example one or more of silicon dioxide, zirconium oxide, titanium oxide, tantalum oxide, magnesium fluoride, aluminum oxide. This provides a concave or convex partly reflective mirror 35. The partially reflective mirror 35 is preferably a circular partially reflective mirror 35. The outer surface 34 is preferably concave or convex to provide a convex or concave partially reflective mirror 35. A Fresnel-type shape may be used. The concave or convex shape may have any suitable radius of curvature, for example from 20 mm to 70 mm. The concave or convex shape or the Fresnel lens shape of the partially reflective mirror 35 may preferably have a focal point. In a preferred embodiment, which is shown in the figures, the optical element 19 is a partially reflective mirror 35 which is convex or concave.

With reference to FIG. 4, at least a second mold part 40 is then provided in step 104, and, in step 104, arranged in relation to the intermediate product 30 such that a second mold cavity 13 is formed. Hence the intermediate product 30 is placed at a distance from the second mold 40. A sealing element 25 may be used to seal the second mold cavity 13. The coating applied in step 102 is at least partly exposed to the second mold cavity 13.

In step 105, lens forming fluid is then provided in the second mold cavity and allowed to solidify. This step is carried out as described above with reference to FIG. 2. The coating applied to produce the optical element in step 102 will then become embedded in the solidified lens forming fluid 74 and in the optical system 70. At least some of the lens forming fluid added in step 105 may come in contact with, and preferably adhere to, some solidified lens fluid 74 added in step 101. The resulting optical system 70 (FIG. 5) may optionally be trimmed to produce the optical system 70 in FIG. 6.

As shown in FIGS. 1 and 4 at least one additional optical element 19 may be placed in the first or second mold cavity 11, 13 to become embedded in the optical system 70. The optical element 19 may be any structure that interacts with light and which is suitable to become incorporated in the lens forming fluid. The optical element 19 may have any suitable thickness but a thickness of at most 5 mm more preferably 1 mm or less may be suitable. The optical element 19 may be selected from a quarter-wave plate 16a, 16b, a linear polarizer 12a, 12b, a circular polarizer, a polarizing beam splitter 14, a circular polarizing reflector 35, a curved linear polarizing reflector, a display 17, a varifocal lens element 15, or an eye-tracking component.

Returning to FIGS. 1 and 4, the additional optical element 19 may be arranged at predefined distances from the surface 34 or from one of the mold parts 10, 20, 40. The distance is selected to suit the purpose of the optical system 70. Spacers 18 may be used to arrange the optical element 19 in the first or second molding cavity 11, 13 before molding. The use of spaces 18 is further described in WO2018087011. The method may include the subsequent step of cutting the optical element 70 to remove the spacers 18 (see FIGS. 5-6).

In a preferred embodiment, a plurality of optical elements 19 is present in the optical system. In a preferred embodiment, shown in FIGS. 1-7 where the optical element 19 obtained by coating is a partially reflective mirror 35, the optical system 70 comprises the following optical elements arranged in order from a light source to a an observer: a first linear polarizer 12a, a first quarter-wave plate 16a, the partially reflective mirror 35, a second quarter-wave plate 16b, a polarization beam splitter 14, and a second linear polarizer 12b.

In one embodiment, the second quarter-wave plate 16b, the polarization beam splitter 14, and the second linear polarizer 12b is placed in the first mold cavity 11 as shown in FIG. 1, and the first linear polarizer 12a and the first quarter-wave plate 16a is placed in the second mold cavity 13 as shown in FIG. 4. The surface 34 is then preferably a convex surface. Alternatively the order of producing the two halves of the optical system 70 is reversed such that the part of the optical system 70 closest to the light source 71 is cast first. Hence, the first linear polarizer 12a and the first quarter-wave plate 16a is placed in a first mold cavity 11 (not shown) and the second quarter-wave plate 16b, the polarization beam splitter 14, and the second linear polarizer 12b is placed in a second mold cavity 13 (not shown). The outer surface 34 is then preferably a concave surface. The optical system 70 shown in FIG. 5 which is produced will however have the same configuration.

Figure 8:
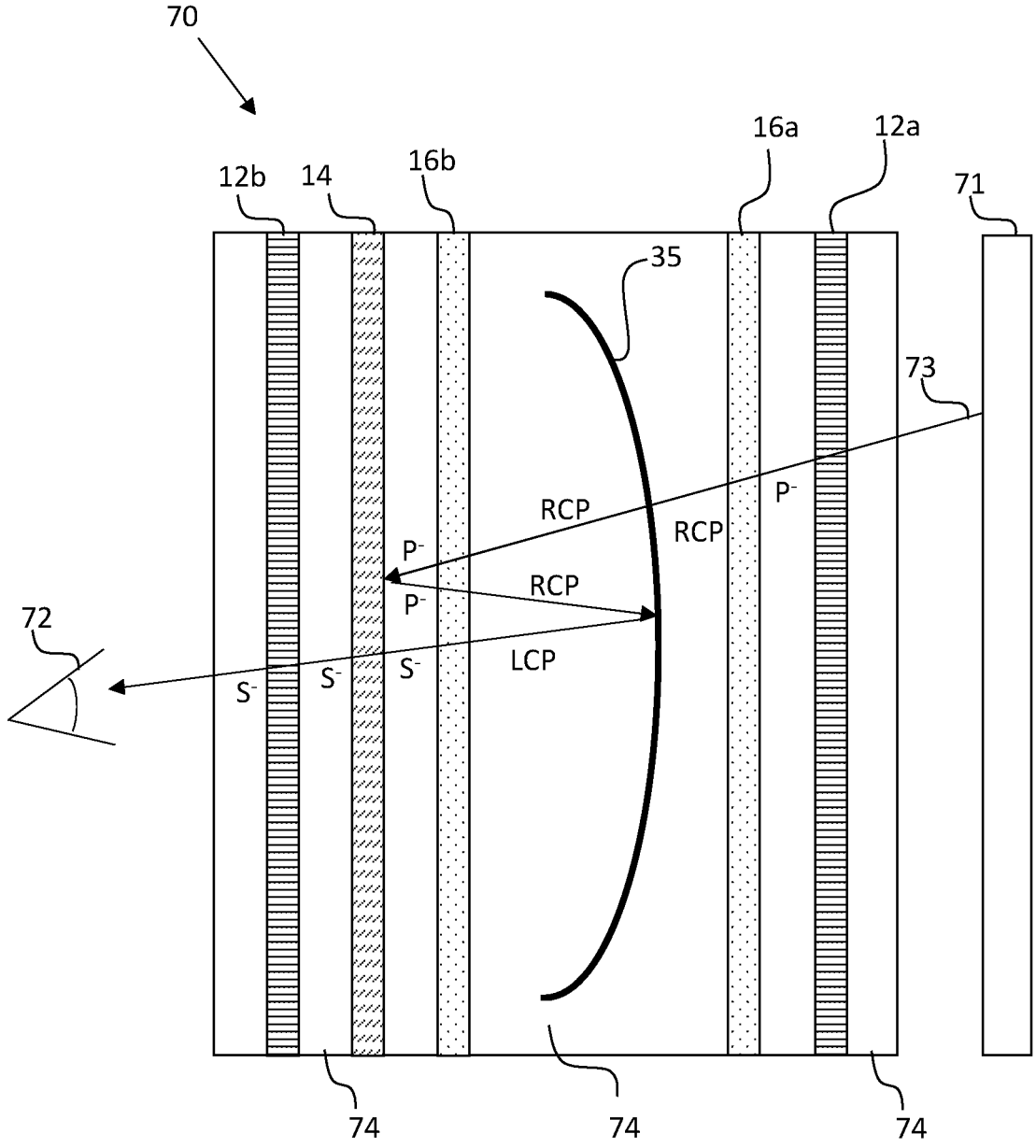
FIG. 8 is a schematic drawing of an embodiment of an optical system.

FIG. 8 shows a preferred embodiment of the optical system 70 produced by the method shown in FIGS. 1-7, comprising a solidified lens forming fluid 74 with the following optical elements 19 embedded and arranged in order from a light source 71 (such as for example a display 17) to a an observer 72: a first linear polarizer 12a, a first quarter-wave plate 16a, a partially reflective mirror 35, a second quarter-wave plate 16b, a polarization beam splitter 14, and a second linear polarizer 12b. The light path 73 is shown and various characteristics of the light path 73, such as polarization, is indicated in the figure. The light path 73 is described in more detail in FIG. 1 of Cakmakci et al. Embedding the various optical elements 19 in a solidified lens material 74 provides several advantages, including providing a sturdier eye-piece where the optical elements 19 are protected from the environment and fixed in relation to each other.

The partially reflective mirror 35 is preferably concave towards the position of the observer 72 with the reflective surface towards the position of the observer 72. The partially reflective mirror 35 is preferably arranged to reflect and concentrate light towards the observer 72.

Figure 9:
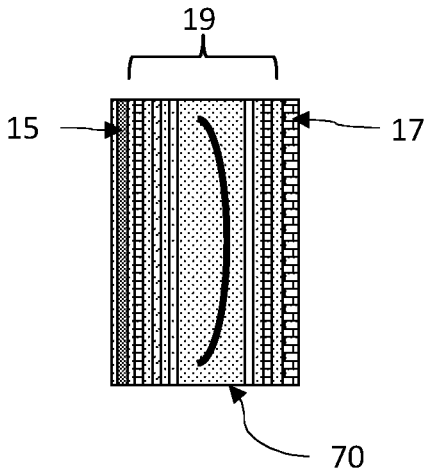
FIGS. 9-10 are schematic drawings of various embodiments of optical systems.

With reference to FIG. 9 the optical system 70 may comprise a light source 71 such as a display 17. Any suitable type of display 17 may be used, such as a LCD, LED, or an OLED display. The display 17 may be preferably transparent. In some embodiments, the display 17 may serve as the second mold part 40 to provide the second mold cavity 13, if necessary, together with a sealing element 25. This has the advantage of not having to provide a separate second mold part 40 and includes the display to the monolithic optical system.

The optical system 70 may furthermore comprise a varifocal lens element 15. The display 17 or the varifocal lens element 15 may be arranged in relation to the other elements as shown in FIG. 9, but any suitable arrangement may be used.

The optical system 70 may furthermore comprise an eye-tracking component. The eye tracking component may comprise one or more of a camera, an illuminator (such as a LED) and an IR volume holographic element (such as a vHOE foil). They should preferably go on the closest embedded film to the eye or, in case of the IR vHOE foil, be the foil embedded closest to the eye. A volume holographic element has the advantage that is has no visible elements. They eye tracking component may be the optical element that is closest to the observer 72.

Figure 10:
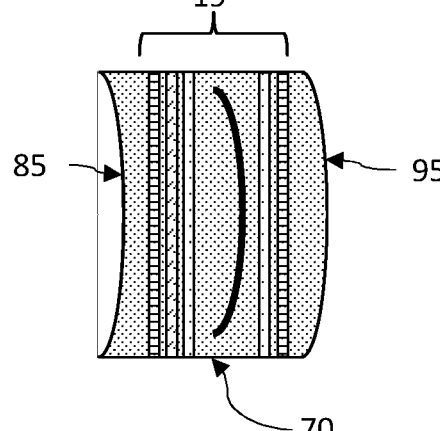

With reference to FIG. 10 the optical system 70 may comprise an outer surface with a concave shape 85 or convex shape 95, which may be obtained by the mold parts 10, 20, 40 or by post-processing applying e.g., known processes like grinding and polishing. The concave shape or convex shape 85, 95 may be selected based on the individual needs of a user, for example to correct for myopia or hyperopia, and may be arranged in any suitable manner in relation to optical elements 19, and the arrangement of FIG. 10 is an example only.

FIGS. 11-13 show a different embodiment of a method for producing an optical system 70. Here the optical system 70 is cast in a one-step molding process where all the optical elements 19 including the partially reflective mirror 35 are first arranged in the mold cavity 55. The partially reflective mirror 35 may be provided on a layer such as a glass layer or on a film which is arranged in mold cavity 55 before casting. When a film is used, a polymethylmethacrylate film (PMMA) may be suitable. To form a curved portion of the partially reflective mirror 35, a thermoforming process can be applied where vacuum or pressure and a heated shaping device or mold is used to form the film. FIG. 11 shows how a number of optical elements 12a, 12b, 14, 35, 16a, and 16b are arranged in the cavity 55 between first and second molds 10, 40. Distance elements 18 are used to position the optical elements 19 correctly. FIG. 12 shows the optical element 70 after casting. In FIG. 13 the distance elements 18 have been removed.

The optical system 70 may be used in, for example, a mixed reality device, an augmented reality device or a virtual reality device for providing an image to an observer 72. Such devices are known to a person skilled in the art. Examples include Microsoft Hololens and Magic Leap One, and Huawei VR Glass.

In general, the embodiments described herein can be combined freely, in so far as they are mutually compatible.

Hence, the invention is not limited to the described embodiments, but can be varied within the scope of the enclosed claims.

The invention claimed is:

1. A method for producing an optical system, the method comprising the steps of, in order
   a) providing at least a first mold part to provide a first mold cavity for an intermediate product with a surface,
   b) providing a lens forming fluid in the first mold cavity, and allowing the lens forming fluid to solidify, to produce a solidified intermediate product with a surface,
   c) coating at least a part of the surface of the solidified intermediate product with a material to produce a functional optical element in the optical system, where the material is different from the lens forming fluid,
   d) providing at least a second mold part for the optical system,
   e) arranging the solidified intermediate product in relation to the second mold part to provide a second mold cavity such that the coating applied in step c) is exposed to the second mold cavity and
   f) providing lens forming fluid in the second mold cavity such that the functional optical element formed in step c) becomes embedded in the lens forming fluid, and allowing the lens forming fluid to solidify.

2. The method of claim 1 where the layer coated in step c) forms a partially reflective mirror.

3. The method of claim 1 where the surface is concave or convex or in a Fresnel lens.

4. The method according to claim 1 where at least one additional optical element is placed in the mold in step a) or step e) to embed the additional optical element in the optical system.

5. The method of claim 4 where the additional optical element is a pre-fabricated, discrete component selected from the group consisting of: a quarter-wave plate, a linear polarizer, a circular polarizer, a polarizing beam splitter, a circular polarizing reflector, a curved linear polarizing reflector, a display, a varifocal lens element, and an eye-tracking component, wherein the pre-fabricated, discrete component is fully encapsulated and mechanically fixed by the solidified lens forming fluid.

6. The method of claim 4 where the optical element in step c) is a partially reflective mirror and the optical system comprises the following optical elements arranged in order from a light source to an observer: a first linear polarizer, a first quarter-wave plate, the beam splitting layer created in step c), a second quarter-wave plate, a polarization beam splitter, and a second linear polarizer.

7. The method of claim 6 where the second quarter-wave plate, the polarization beam splitter, and the second linear polarizer are placed in the first mold cavity in step a) and the first linear polarizer and the first quarter-wave plate are placed in the second mold cavity in step e) or where the first linear polarizer and the first quarter-wave plate are placed in the first mold cavity in step a) and where the second quarter-wave plate, the polarization beam splitter, and the second linear polarizer are placed in the second mold cavity in step e).

8. The method of claim 4 where the at least one additional optical element is placed at a predefined distance from the surface which is coated in step c).

9. The method of claim 8 where the additional optical element is placed at a predefined distance from the surface to be coated in step c) using a distance element.

10. The method of claim 1 where the coating in step c) is carried out using a thin film deposition technology.

\* \* \* \* \*